United States Patent
Hsu

(10) Patent No.: US 9,073,592 B2
(45) Date of Patent: Jul. 7, 2015

(54) HEIGHT ADJUSTABLE SEAT TUBE WITH OIL STORAGE UNIT

(76) Inventor: Jung Yu Hsu, Tainan (TW)

(*) Notice: Subject to any disclaimer, the term of this patent is extended or adjusted under 35 U.S.C. 154(b) by 851 days.

(21) Appl. No.: 13/271,560

(22) Filed: Oct. 12, 2011

(65) Prior Publication Data

US 2013/0093231 A1    Apr. 18, 2013

(51) Int. Cl.
| | | |
|---|---|---|
| B62J 1/08 | (2006.01) | |
| A47C 3/40 | (2006.01) | |
| B62J 1/06 | (2006.01) | |
| B62K 19/36 | (2006.01) | |
| A47C 3/30 | (2006.01) | |
| A47C 7/00 | (2006.01) | |
| A61G 5/10 | (2006.01) | |

(52) U.S. Cl.
CPC .... B62J 1/08 (2013.01); *A47C 3/30* (2013.01); *A47C 3/40* (2013.01); B62J 1/06 (2013.01); *A47C 7/004* (2013.01); *A61G 5/1059* (2013.01); *Y10S 297/03* (2013.01); B62K 19/36 (2013.01); *B62J 2001/085* (2013.01)

(58) Field of Classification Search
CPC .............................. A47C 3/30; B62J 2001/085
See application file for complete search history.

(56) References Cited

U.S. PATENT DOCUMENTS

| | | | | |
|---|---|---|---|---|
| 3,774,895 A | * | 11/1973 | Willich et al. ................. | 267/136 |
| 3,819,166 A | * | 6/1974 | Ellis et al. .................... | 267/64.21 |
| 3,861,740 A | * | 1/1975 | Tajima et al. ............. | 297/215.13 |
| 4,122,923 A | * | 10/1978 | Ellis et al. ...................... | 188/285 |
| 4,245,563 A | * | 1/1981 | Empson ..................... | 105/198.3 |
| 4,257,499 A | * | 3/1981 | Deschner ....................... | 188/287 |
| 4,474,267 A | * | 10/1984 | Empson .......................... | 188/33 |
| 4,560,042 A | * | 12/1985 | Sell et al. .................. | 188/322.21 |
| 4,592,590 A | * | 6/1986 | Slaats et al. .............. | 297/344.19 |
| 4,624,346 A | * | 11/1986 | Katz ........................... | 188/282.9 |
| 4,702,356 A | * | 10/1987 | Katz et al. ...................... | 188/315 |
| 4,742,898 A | * | 5/1988 | Lee ................................ | 188/287 |
| 5,362,034 A | * | 11/1994 | Wang ......................... | 267/64.12 |
| 5,511,759 A | * | 4/1996 | DeKraker et al. ............. | 248/575 |
| 5,961,556 A | * | 10/1999 | Thorn ............................. | 623/27 |
| 6,648,309 B2 | * | 11/2003 | Beck .......................... | 267/64.17 |
| 8,052,128 B2 | * | 11/2011 | Kirchner et al. ........... | 267/64.17 |
| 8,196,948 B2 | * | 6/2012 | Chang ........................ | 280/281.1 |
| 8,302,983 B1 | * | 11/2012 | Hsu .............................. | 280/281.1 |
| 8,308,124 B2 | * | 11/2012 | Hsu ................................ | 248/599 |
| 8,814,109 B2 | * | 8/2014 | Laird et al. ................. | 248/125.8 |

(Continued)

FOREIGN PATENT DOCUMENTS

| | | | |
|---|---|---|---|
| DE | 1800020 A | * | 10/1968 |
| DE | 9404508 U1 | * | 4/1995 |
| EP | 0348801 A1 | * | 1/1990 |
| FR | 2302431 A1 | * | 9/1976 |

*Primary Examiner* — Joshua J Michener
*Assistant Examiner* — Chiedu Chibogu
(74) *Attorney, Agent, or Firm* — Rosenberg, Klein & Lee

(57) ABSTRACT

A height adjustable seat tube includes an outer tube and an inner tube is inserted into the outer tube. An end cap is fixed to the inner tube and a valve unit in the inner tube extends through the end cap and co-movable linearly with the inner tube. An inlet valve is connected to the inner tube. An oil tube is connected between the inlet valve and the valve unit. A first oil room is defined between the oil tube and the valve unit. An oil storage member is connected between a connection member and the end cap. A first air room is defined between the inlet valve, the oil storage member and the inner tube. A second oil room is defined between the oil tube, the oil storage member and the end cap. An oil path is in communication between the first and second oil rooms.

10 Claims, 9 Drawing Sheets

(56) References Cited

U.S. PATENT DOCUMENTS

2010/0187055 A1* 7/2010 Becker et al. ................ 188/275
2011/0181082 A1* 7/2011 Chang ...................... 297/215.13
2012/0006949 A1* 1/2012 Laird et al. .................... 248/161
2012/0098175 A1* 4/2012 Wu ............................... 267/132
2013/0156492 A1* 6/2013 Maier ........................ 403/109.7

* cited by examiner

HEIGHT ADJUSTABLE SEAT TUBE WITH OIL STORAGE UNIT

FIELD OF THE INVENTION

The present invention relates to a bicycle seat tube, and more particularly, to a seat tube having an oil storage unit received so as to save space for oil rooms and the seat is height adjustable.

BACKGROUND OF THE INVENTION

A conventional bicycle seat is connected with a seat post which is inserted in the seat tube of the bicycle frame, and the seat is secured by a clamp unit. The seat supports the cyclist's weight and bears the force transmitted from the ground. The latest version of the bicycle seats can adjust the height and angle of the seat.

The conventional seat adjustable devices generally include mechanical adjustable devices, hydraulic/pneumatic adjustable devices, and hybrid adjustable devices which uses air and hydraulic media. The mechanical adjustable devices use mechanical parts to set the relative height between the seat post and the seat tube by linear movement. The hydraulic/pneumatic adjustable devices use hydraulic liquid such as oil or air cooperated with paths to achieve the purposes of adjustment of the seat. The hybrid adjustable devices utilize both of the air and hydraulic liquid to adjust the pressure change between the oil room and the air room to adjust the height of the seat relative to the seat tube.

The hydraulic/pneumatic adjustable devices include an outer tube and a seat post, and oil rooms and air rooms located in the outer tube and the seat post. There are two oil rooms and oil paths communicate between the oil rooms. Valve units are located in the pre-set positions of the oil paths so as to adjust the volume of the oil. The related positions between the parts of different hydraulic/pneumatic adjustable devices are different.

Taiwan Utility Model 099221791 discloses a hybrid adjustable device which has an outer tube, an inner tube, a head unit and an adjustable unit, wherein the inner tube is received in the outer tube and movable relative to the outer tube. The head unit is connected to an end of the inner tube which extends out from the outer tube. The adjustable unit is connected to the head and the inner tube and includes a path, an interior tube that is fixed to the head unit and has one end inserted into the inner tube, a shaft extending through the interior tube, a fixing member fixed to the distal end of the interior tube and located in the inner tube, a piston movably mounted to the inner tube and movable relative to the fixing member, a valve unit connected to the head unit and a handle that is pivotably connected to the head unit and co-rotated with the shaft. The inner tube defines a sub oil room between the piston and the fixing member, and a main oil room is defined between the fixing member and the distal end of the inner tube. The path is located in the inner tube, the interior tube and the fixing member. An air room is defined between the piston and the head unit. By operation of the handle, the shaft opens or closes the path so that the oil flows through the path to move the piston relative to the fixing member, and in the meanwhile, changes the volume of the oil in the main oil room and the sub oil room, and compresses the air in the air room.

Another hybrid adjustable device is disclosed in Taiwan Utility Model 098209833 and includes a seat post, a seat tube in which the seat post is linearly movable, a connection portion connected to the top of the seat tube and having a through hole, a head unit connected to the top of the seat tube so as to clamp the seat, a height adjustable device located between the head tune and the seat tube so as to adjust the linear movement of the seat tube and the seat post. The height adjustable device has a adjustable path which communicates with the through hole. By control of the close and open statuses of the adjustable path, the seat post is movable linearly in the seat tube and set its position. A pressure balance device is connected to the connection portion to assist the regulation of the oil and has a bottle with a piston received therein. The piston defines the interior of the bottle into an oil room and an air room. An oil path is defined in the bottle and communicates with the oil room and the through hole.

The first embodiment of the prior art shows an inner tube movably inserted into the outer tube with oil and air located therein and the users can control the positions of the oil in the inner and outer tube, and control the pressure of the air. The handle is exposed from the seat tube and no exterior oil bottle is needed. The second embodiment of the prior art discloses a pressure balance device which is located outside of the seat tube, by control to the adjustable path, the seat post is movable linearly relative to the seat tube to adjust the height of the seat.

When the seat is adjusted to a lower position, the seat post has to be merged into the seat tube and this compresses the room of the oil room so that the oil in the oil room has to move to other space to be storage. When the seat is adjusted to a higher position, the oil flows back to the oil room. Therefore, there is a sub oil room for storage of the oil.

The sub oil room of the first embodiment is located in the seat tube so that the size of the seat tube has to be large enough to accommodate the oil, therefore, the seat tube and the outer tube have to be made in special specifications. The size of the bicycle frame is increased as well to cooperate with the large sized seat tube. The exterior bottle of the second embodiment does not need to enlarge the size of the seat tube so that the conventional bicycle frame can be used. However, the cyclists may hit the exterior bottle during cycling. The exterior bottle does not meet the aesthetic expectation. The exterior bottle has to be made individually and the installation takes time which increases the manufacturing cost.

The present invention intends to provide a height adjustable bicycle seat tube which does not need the exterior bottle and has low manufacturing cost.

SUMMARY OF THE INVENTION

The present invention relates to a height adjustable seat tube and comprises an outer tube having a valve unit located in the outer tube and fixed to a closed end of the outer tube. The valve unit extends toward an open end of the outer tube. An inner tube is inserted into the outer tube form the open end of the outer tube and valve unit is located in the inner tube. The inner tube is movable linearly between the outer tube and the valve unit. An end cap is fixed to a first end of the inner tube and the valve unit extends through the end cap and is co-movable linearly with the inner tube. The inner tube has an inlet valve connected to a second end thereof. An oil tube has a first end connected to the inlet valve and a second end of the oil tube accommodates the valve unit. The oil tube is co-movable linearly with the inner tube. A first oil room is defined between the oil tube and the valve unit. An oil storage member is an elongate tube and made by resilient material, the oil storage member is mounted to the oil tube. A first end of the oil storage member is fixed to a connection member and a second end of the oil storage member is fixed to the end cap. A first air room is defined between the inlet valve, the oil storage member and the inner tube. A second oil room is defined between the oil tube, the oil storage member and the end cap. An oil path is in communication between the first and second oil rooms. By operation of the valve unit, oil in the first oil room flows into the second oil room via the valve unit and the end cap.

The primary object of the present invention is to provide a height adjustable seat tube which has an oil storage member located in the air room, cooperated with the path communicating with the main oil room and the sub oil room, the seat can be adjustable.

The second object of the present invention is to provide a height adjustable seat tube which has an oil storage member that is flexible in size, so that the inner tube and the outer tube do not need to be made in special specification and can be used with the conventional bicycle frame.

The third object of the present invention is to provide a height adjustable seat tube which has an oil storage member that is flexible in size so as to form a sub oil room. No exterior bottle is needed and can be cooperated with the conventional bicycle frame. The aesthetic purpose is also met.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
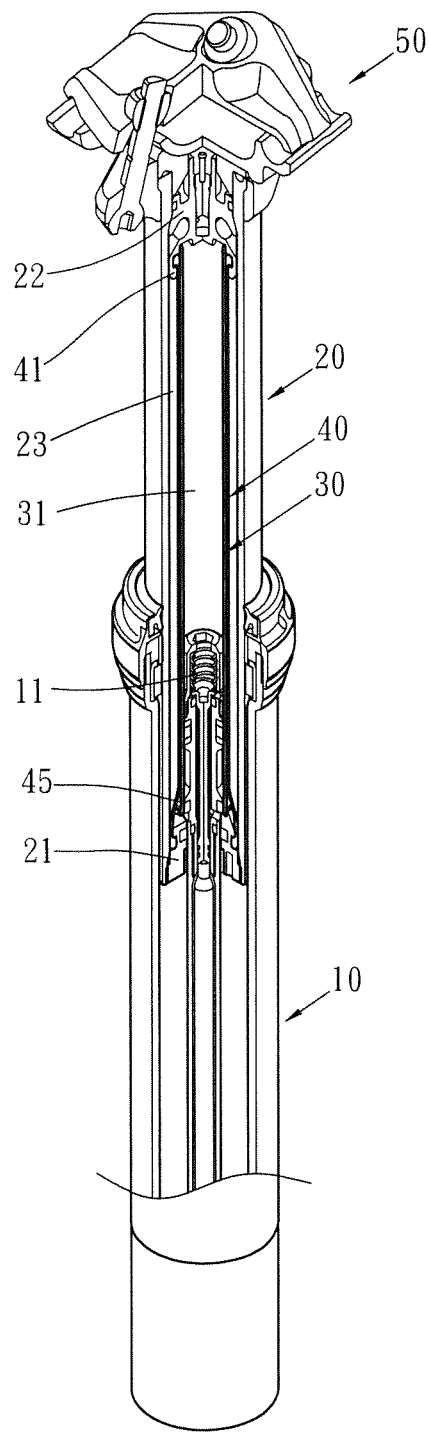
FIG. 1 is a perspective view, partly removed, of the height adjustable seat tube of the present invention.
Figure 2:
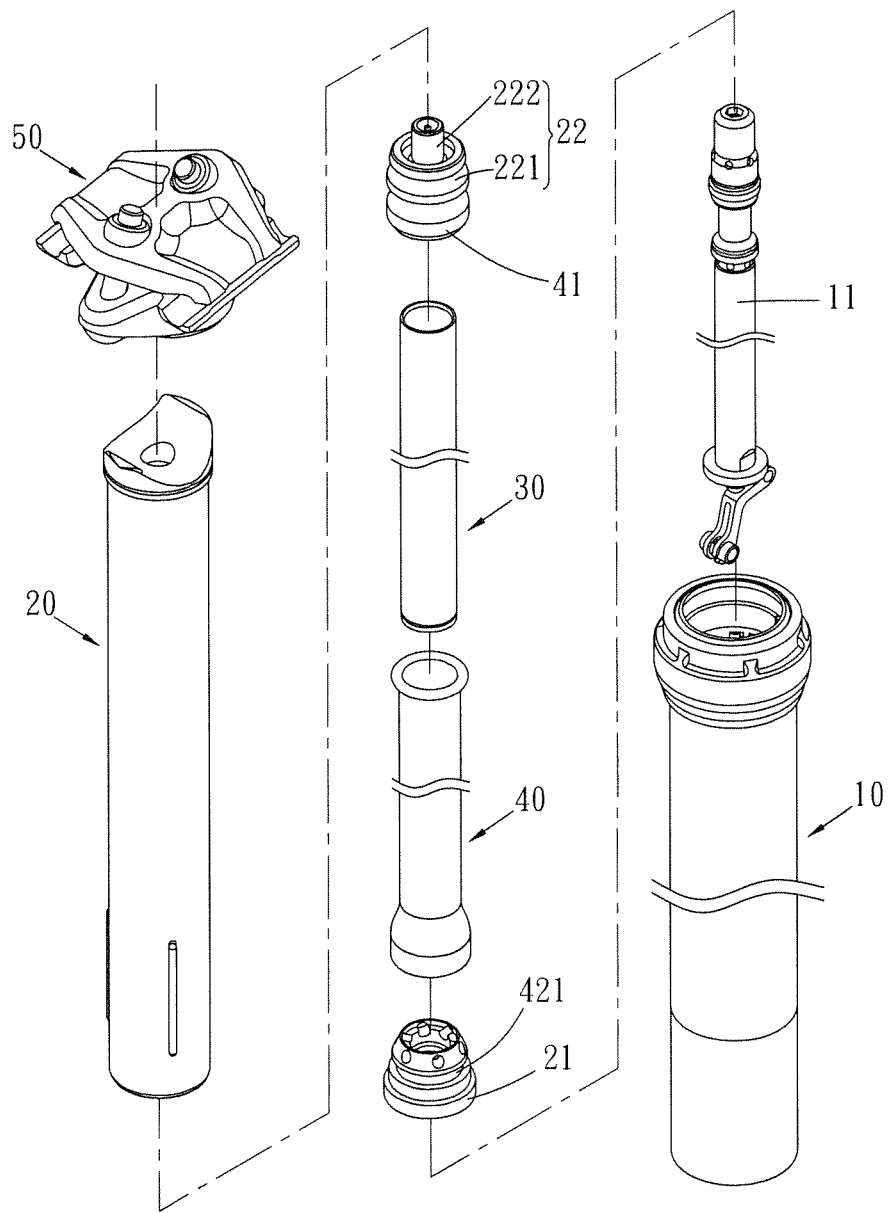
FIG. 2 is an exploded view to show the height adjustable seat tube of the present invention.
Figure 3:
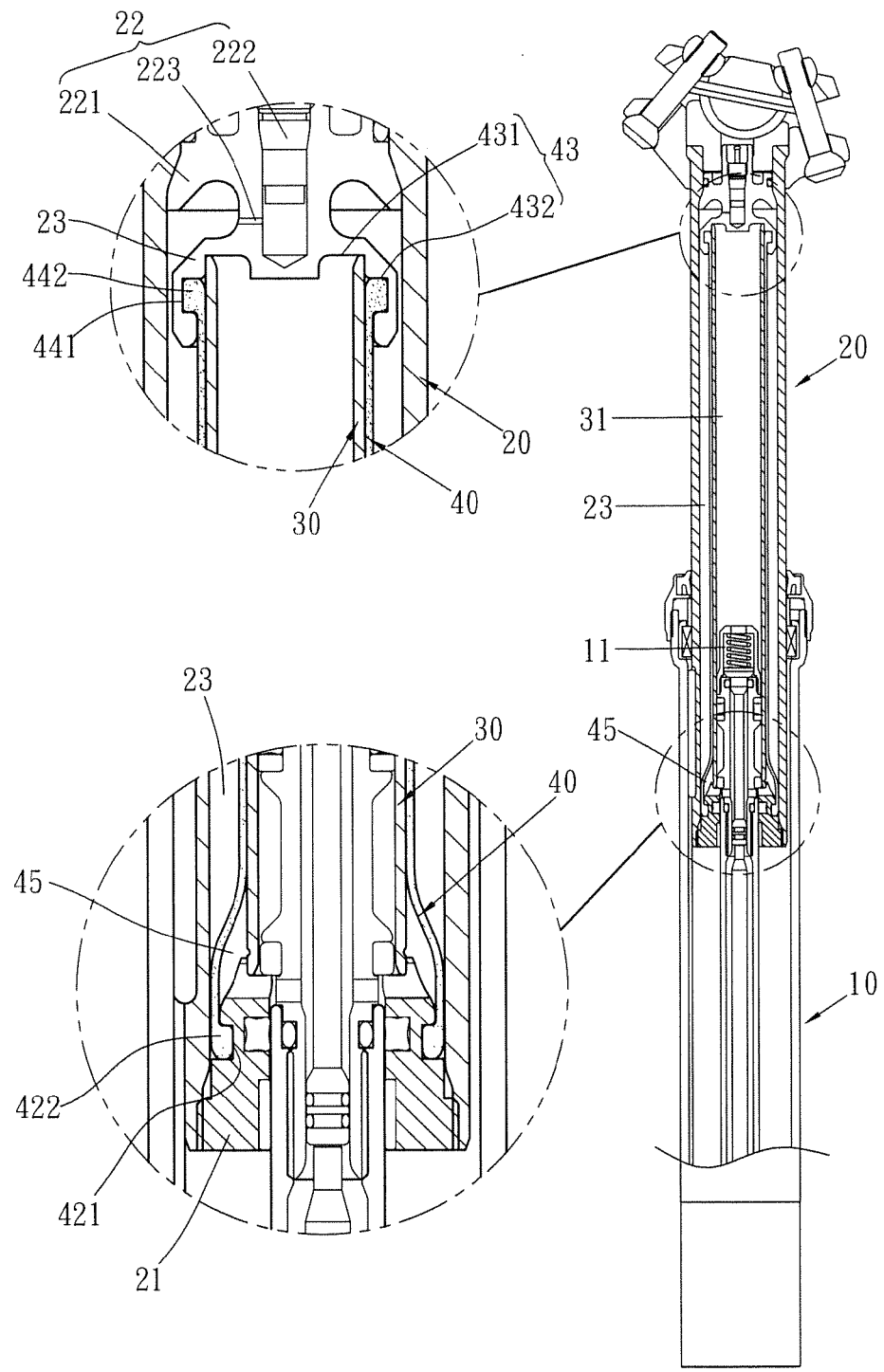
FIG. 3 is a cross sectional view to show the height adjustable seat tube of the present invention.

Referring to FIGS. 1 to 3, the height adjustable seat tube of the present invention comprises an outer tube 10, an inner tube 20, an oil tube 30 in the inner tube 20, an oil storage member 40 and a clamp unit 50 located at the exposed end of the inner tube 20.

The outer tube 10 has a valve unit 11 located therein and fixed to a closed end of the outer tube 10. The valve unit 11 extends toward an open end of the outer tube 10.

The inner tube 20 is inserted into the outer tube form the open end of the outer tube 10 and the valve unit 11 is located in the inner tube 20. The inner tube 20 is movable linearly between the outer tube 10 and the valve unit 11. An end cap 21 is fixed to a first end of the inner tube 20. The valve unit 11 extends through the end cap 21 and is co-movable linearly with the inner tube 20. The inner tube 20 has an inlet valve 22 connected to a second end thereof so as to be connected with an inflation device.

The oil tube 30 has a first end connected to the inlet valve 22 and a second end of the oil tube 30 accommodates the valve unit 11. The oil tube 30 is co-movable linearly with the inner tube 20. A first oil room 31 is defined between the oil tube 30 and the valve unit 11.

The oil storage member 40 is an elongate tube and made by resilient material, the oil storage member 40 is mounted to the oil tube 30. A first end of the oil storage member 40 is fixed to a connection member 41 and a second end of the oil storage member 40 is fixed to the end cap 21. The connection member 41 is integrally formed with the inlet valve 22. The end cap 21 has a first engaging portion 421 located at the outer periphery thereof and the oil storage member 40 has a second engaging portion 422 which is engaged with the first engaging portion 421. The connection member 41 has a recess unit 43 which is located corresponding to the oil storage member 40. The recess unit 43 is a stepped recess which includes a first recess 431 and a second recess 432 which has a diameter larger than that of the first recess 431. The oil tube 30 is fixed to the first recess 431 and the oil storage member 40 is fixed to the second recess 432. A groove 441 is defined in the inside of the recess unit 43 and the oil storage member 40 has a protrusion 442 which is engaged with the groove 441.

A clamp unit 50 is connected to the second end of the inner tube 20 and connected to a bar located under the seat.

A first air room 23 is defined between the inlet valve 22, the oil storage member 40 and the inner tube 20. A second oil room 45 is defined between the oil tube 30, the oil storage member 40 and the end cap 21. An oil path 46 is in communication between the first and second oil rooms 31, 45. Oil in the first oil room 31 flows into the second oil room 45 via the valve unit 11 and the end cap 21 by operation of the valve unit 11.

The inlet valve 22 has a base 221 which is fixed to the inner tube 20. The base 221 has an inlet valve 222 and an air path 223. The inlet valve 222 is to be connected with an inflation device. The air path 223 communicates between the inlet valve 222 and the first air room 23. The inlet valve 222 closes or opens the air path 223 so as to maintain a pressure in the first air room 23.

By the flexible oil storage member 40 which is located in the air room 23 with pressurized air filled therein, and the oil path 463 communicates with the first and second oil rooms 31, 45, there will be no need for an exterior bottle to store oil and the assembling cost and the manufacturing cost are reduced.

When assembling, the two ends of the oil tube 30 are installed in the first recess 431 and the end cap 21, and the two ends of the oil storage member 40 are connected to the connection member 41 and the end cap 21. The first engaging portion 421 is engaged with the second engaging portion 422, and the protrusion 442 is engaged with the groove 441. The oil tube 30 and the oil storage member 40 are located in the inner tube 20, and the inlet valve 22 is located at the second end of the inner tube 20, and the end clap 21 is positioned in the first end of the inner tube 20. The inner tube 20 extends through the outer tube 11 and the valve unit 11 extends through the oil tube 30. The clamp unit 50 is connected to the exposed end of the inner tube 20.

Figure 4:
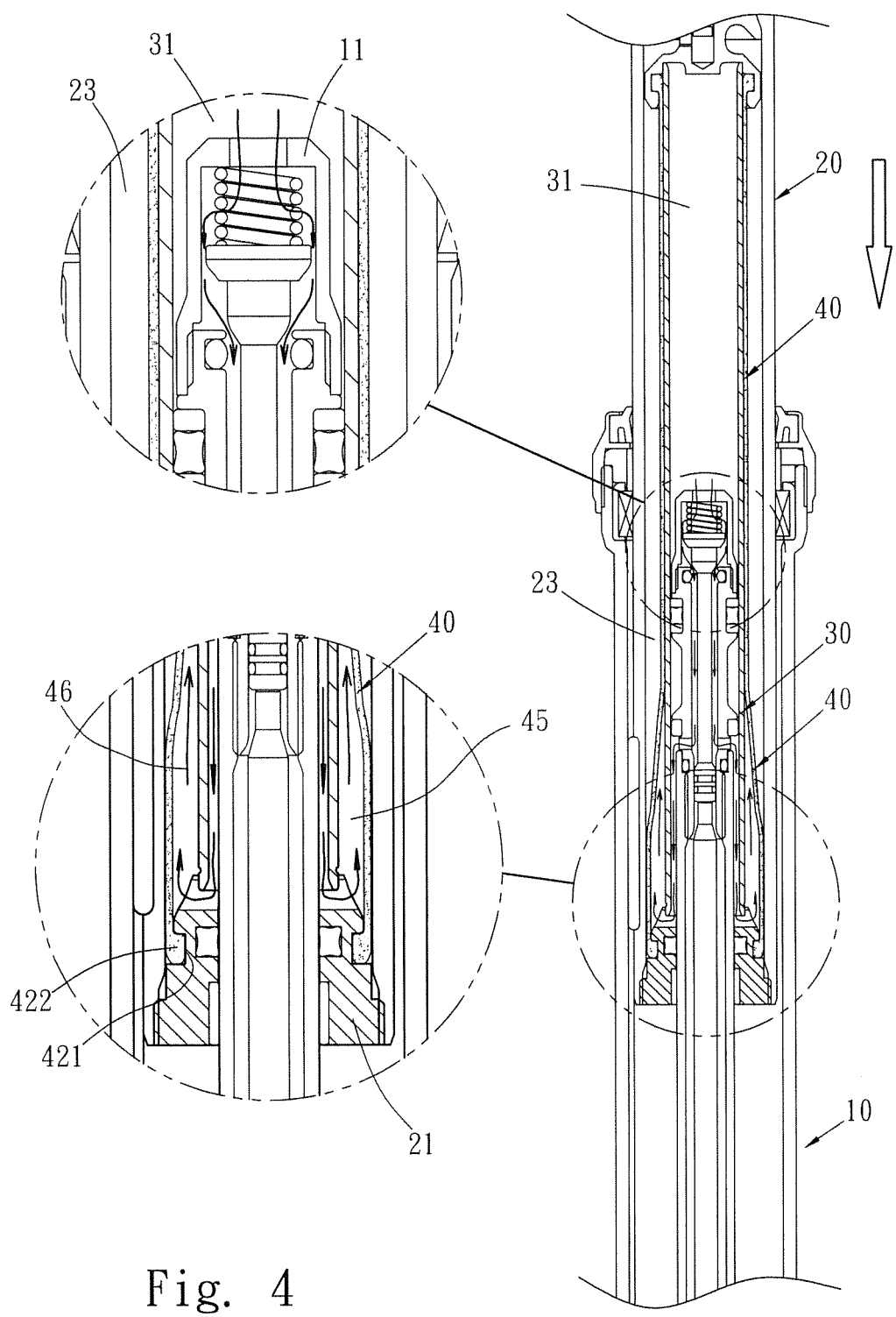
FIG. 4 shows an operational status of the height adjustable seat tube of the present invention.
Figure 5:
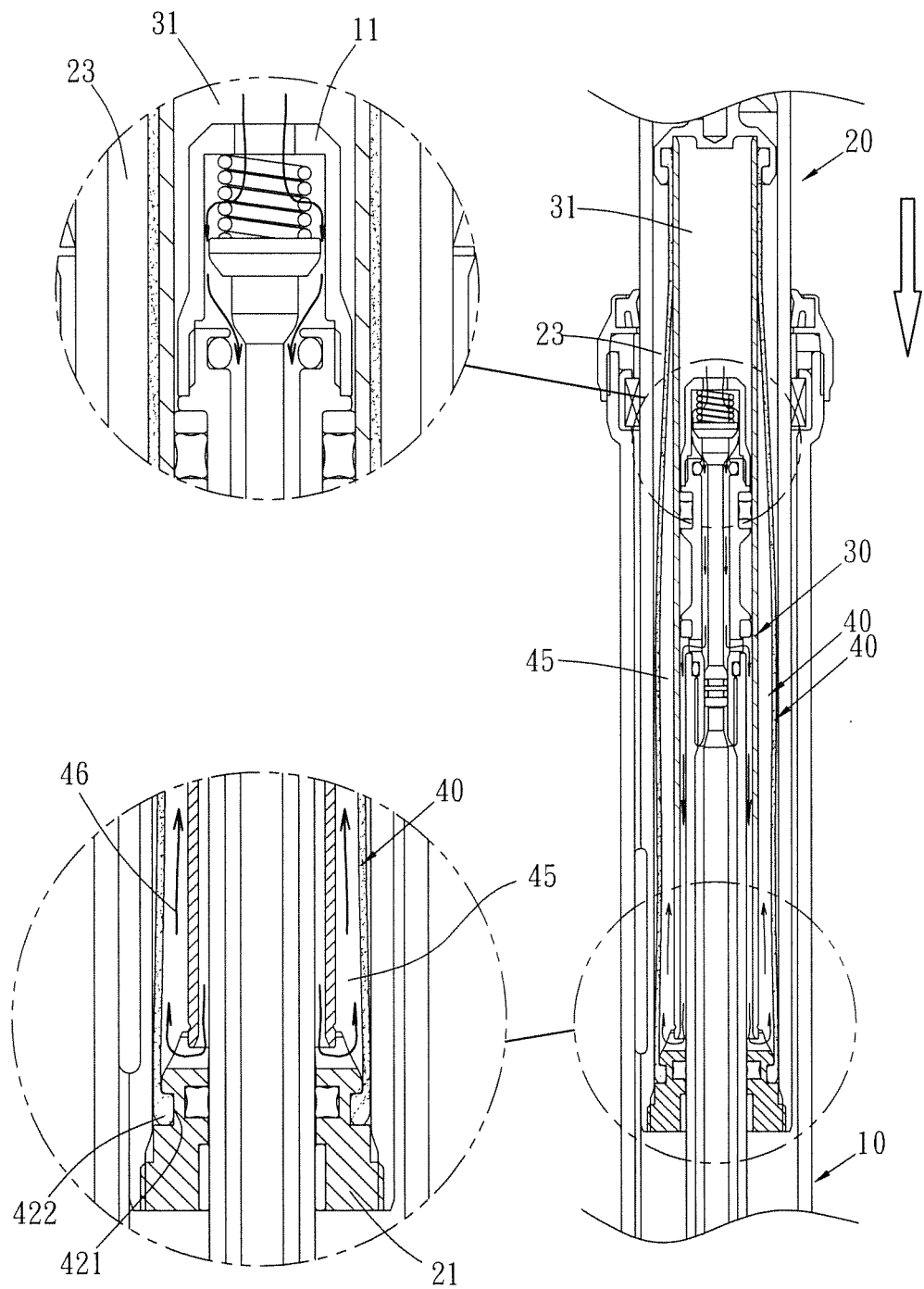
FIG. 5 shows another operational status of the height adjustable seat tube of the present invention.

As shown in FIGS. 4 and 5, the valve unit 11 and the oil path 46 are opened, the inner tube 20 is gradually moved toward the interior of the outer tube 10. The first oil room 31 is gradually reduced and the oil in the first oil room 31 passes through the valve unit 11 and enters into the oil path 46, and eventually enters into the second oil room 45 to inflate the oil storage member 40. The inflation of the oil storage member 40 compresses the interior space of the air room 23 and the pressure in the air room 23 increases. The lower that the inner tube 20 is adjusted, the more oil that enters into the second oil room 45, and the oil storage member 40 inflates to occupy the space in the air room 23 so that the pressure of the air room 23 increases.

When the inner tube 20 is set, the valve unit 11 and the oil path 46 are closed, and the inner tube 10 and the outer tube 20 are stationary relative to each other.

The adjustment steps are reversely operated when adjusting the inner tube 20 higher. The valve unit 11 and the oil path 46 are opened, the inner tube 20 is gradually pulled in the direction away from the outer tube 30. The first oil room 31 is gradually expanded and because the pressure of the air room is sufficient so that the pressure compresses the oil storage member 40. The oil in the second oil room 45 passes through the valve unit 11 and the oil path 46, and eventually enters into the first oil room 31. The oil storage member 40 is gradually flattened and the pressure in the air room 23 reduces. The higher that the inner tube 20 is adjusted, the more oil that enters into the first oil room 31, and the oil storage member 40 reduces and occupies less space in the air room 23 so that the pressure of the air room 23 decreases until a pressure balance is reached between the first and second oil rooms 31, 45 and the air room 23.

The flexible oil storage member 40 is located in the air room 23 and the space that the oil storage member 40 occupies can be adjusted by the pressure in the air room 23. The first and second oil rooms 31, 45 and the air room 23 share a common space. The oil path 46 communicates with the first and second oil rooms 31, 45. The valve unit 11 controls the oil path 46 to be opened and closed. By the above mentioned arrangements, the height of the seat can be adjusted.

The first and second oil rooms 31, 45 and the air room 23 share a common space, so that no extra space is needed. Therefore, the inner and outer tubes 10, 20 do not need to change and can be cooperated with the conventional bicycle frames.

The oil storage member 40 forms the flexible second oil room 45 which can be compressed by the pressure in the air room 23. The oil in the second oil room 45 flows back to the first oil room 31 by the change of interior space of the oil storage member 40. The first and second oil rooms 31, 45 and the air room 23 sharing a common space makes the oil to be returned automatically.

The oil storage member 40 forms the flexible second oil room 45 which can be compressed by the pressure in the air room 23, so that the oil is stored in the oil storage member 45 without need of exterior bottle to store the oil. The shortcomings caused by the exterior bottle of the conventional example can be overcome.

Figure 6:
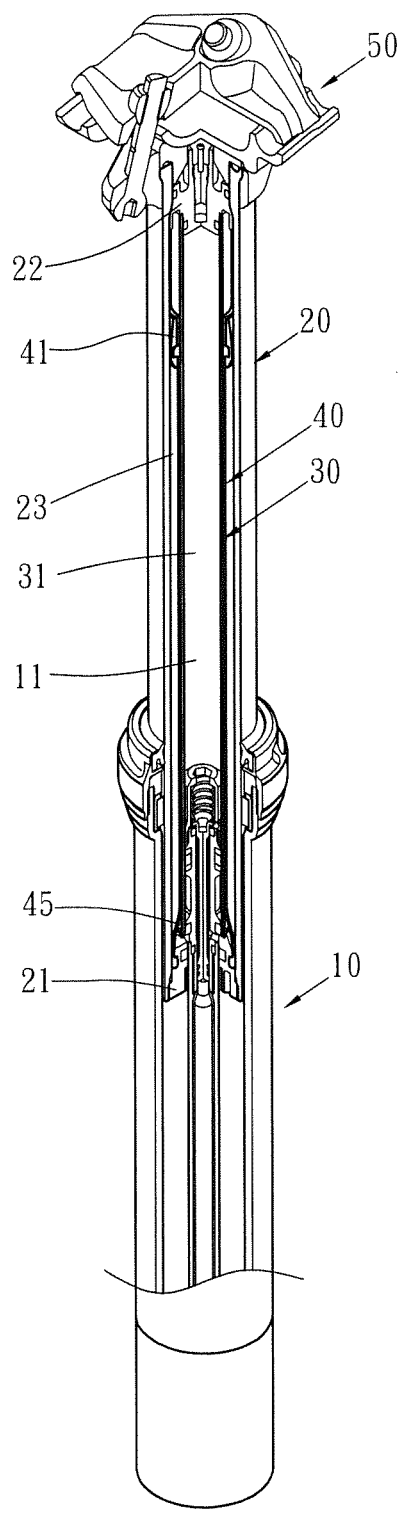
FIG. 6 is a perspective view, partly removed, of the second embodiment of the height adjustable seat tube of the present invention.
Figure 7:
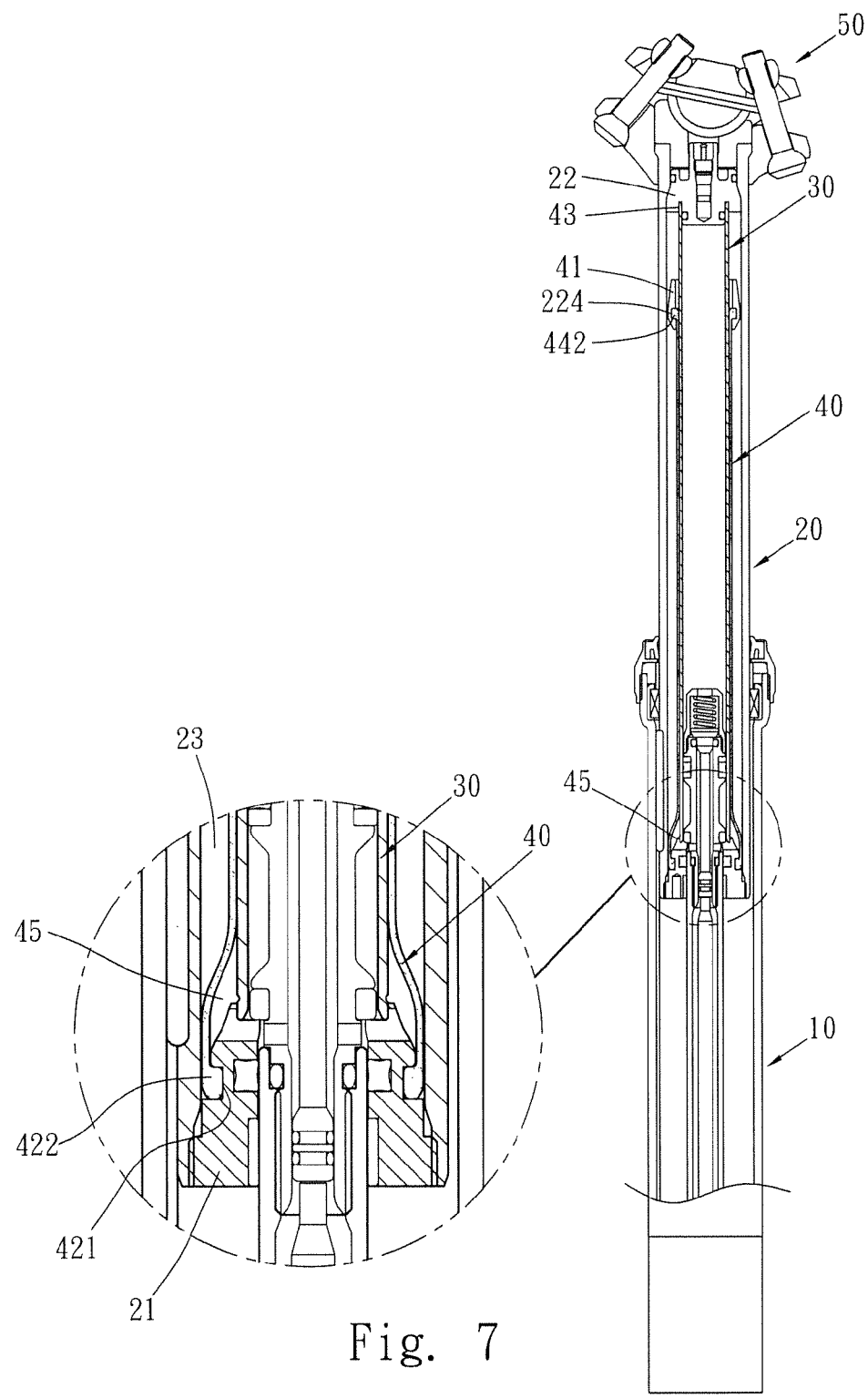
FIG. 7 is a cross sectional view to show the height adjustable seat tube disclosed in FIG. 6 of the present invention.

FIGS. 6 and 7 show the second embodiment of the present invention, wherein the connection member 41 is individually located between the inlet valve 22 and the end cap 21. The connection member 41 is linearly movable relative to outside of the oil tube 30 by pressure change of the first air room 23 and the second oil room 45, so as to balance pressure between the first air room 23, the first oil room 31 and the second oil room 45. The connection member 41 has a recess unit 43 which is located corresponding to the oil storage member 40. A groove 441 is defined in the inside of the recess unit 43 and the oil storage member 40 has a protrusion 442 which is engaged with the groove 441. The inlet valve 22 has a base 221 fixed to the inner tube 20 and the base 221 has a connection groove 224 located corresponding to the oil tube 30. An end of the oil tube 30 is fixedly engaged with the connection groove 224.

The difference between the first and second embodiments is that the connection member 41 is movable along the oil tube 30 by the change of pressure.

Figure 8:
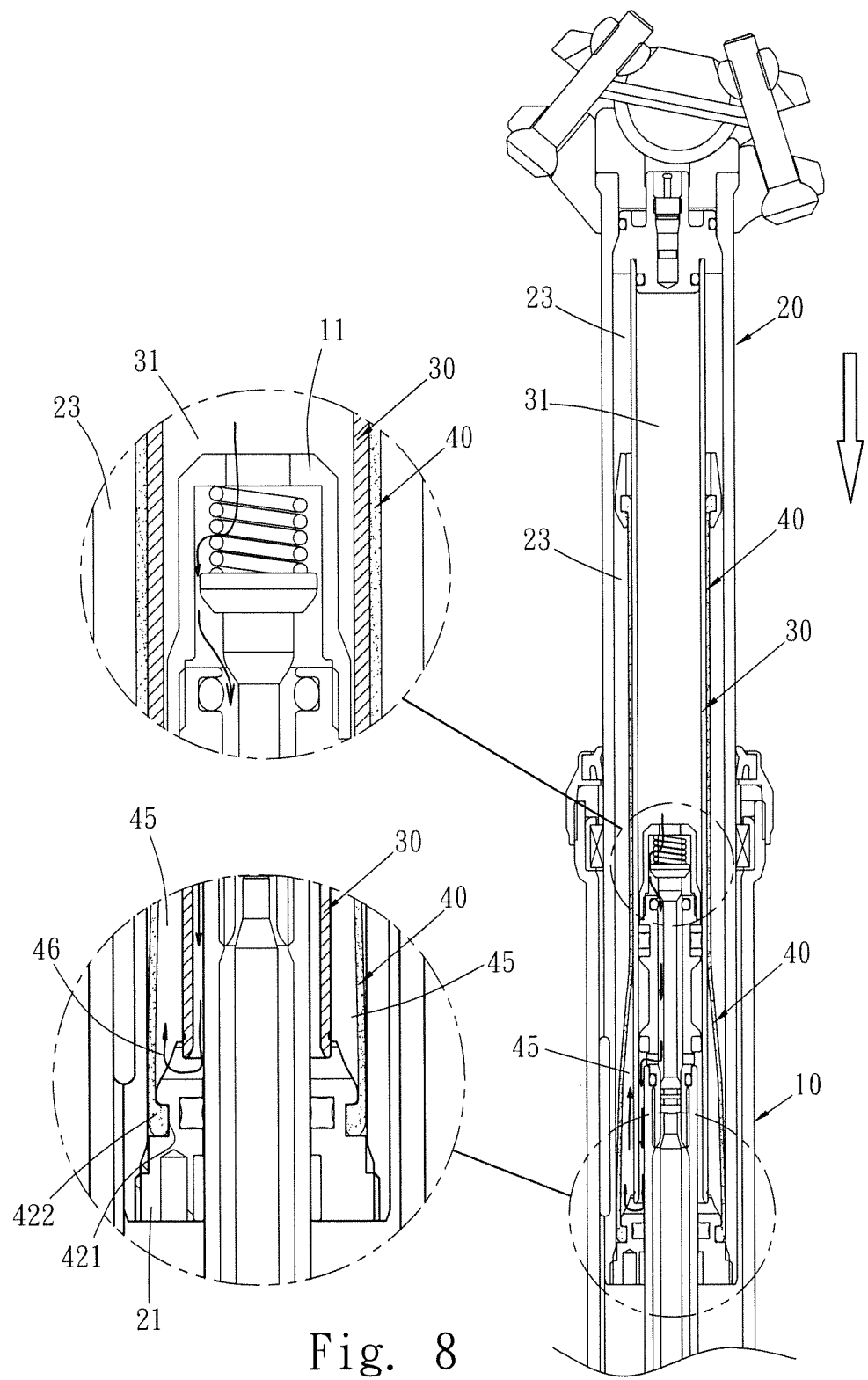
FIG. 8 shows an operational status of the height adjustable seat tube disclosed in FIG. 6 of the present invention.
Figure 9:
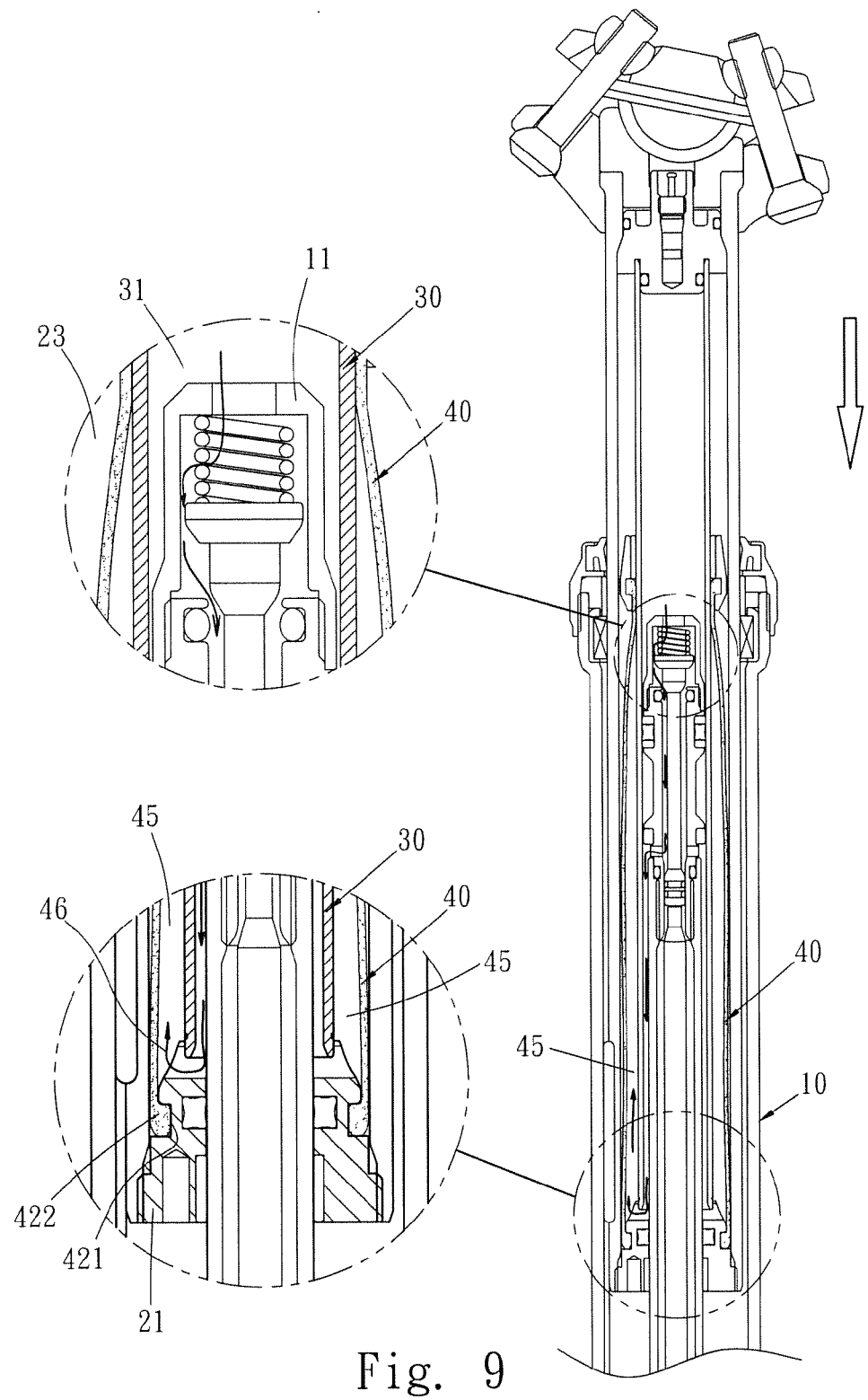
FIG. 9 shows another operational status of the height adjustable seat tube disclosed in FIG. 6 of the present invention.

As shown in FIGS. 8 and 9, the valve unit 11 and the oil path 46 are opened, the inner tube 20 is gradually moved toward the interior of the outer tube 10. The first oil room 31 is gradually reduced and the oil in the first oil room 31 passes through the valve unit 11 and enters into the oil path 46, and eventually enters into the second oil room 45 to inflate the oil storage member 40. The inflation of the oil storage member 40 compresses the interior space of the air room 23 and the pressure in the air room 23 increases. The connection member 41 moves toward the valve unit 11 due to the inflation of the oil storage member 40. The lower that the inner tube 20 is adjusted, the more oil that enters into the second oil room 45, and the oil storage member 40 inflates to occupy the space in the air room 23 so that the pressure of the air room 23 increases and the connection member 41 is more close to the valve unit 11.

The adjustment steps are reversely operated when adjusting the inner tube 20 higher. The valve unit 11 and the oil path 46 are opened, the inner tube 20 is gradually pulled in the direction away from the outer tube 30. The first oil room 31 is gradually expanded and because the pressure of the air room is sufficient so that the pressure compresses the oil storage member 40. The oil in the second oil room 45 passes through the valve unit 11 and the oil path 46, and eventually enters into the first oil room 31. The oil storage member 40 is gradually flattened and the pressure in the air room 23 reduces. The connection member 41 moves toward the inlet valve 22. The higher that the inner tube 20 is adjusted, the more oil that enters into the first oil room 31, and the oil storage member 40 reduces and occupies less space in the air room 23 so that the pressure of the air room 23 decreases and the connection member 41 is more close to the inlet valve 22, until a pressure balance is reached between the first and second oil rooms 31, 45 and the air room 23.

The connection member 41 is movable so as to restrict the inflation of the oil storage member 40 such that the pressure of the air room 23 and the first and second oil rooms 31, 45 are stabilized and the sudden movement of the inner tube 20 can be avoided.

While we have shown and described the embodiment in accordance with the present invention, it should be clear to those skilled in the art that further embodiments may be made without departing from the scope of the present invention.

What is claimed is:

1. A height adjustable seat tube comprising:

an outer tube having a valve unit located in the outer tube and fixed to a closed end of the outer tube, the valve unit extending toward an open end of the outer tube;

an inner tube inserted into the outer tube from the open end of the outer tube and the valve unit located in the inner tube, the inner tube movable linearly between the outer tube and the valve unit, an end cap fixed to a first end of the inner tube and co-movable linearly with the inner tube, the valve unit extending through the end cap, the inner tube having an inlet valve connected to a second end thereof;

an oil tube having a first end connected to the inlet valve and a second end of the oil tube accommodating the valve unit, the oil tube being co-movable linearly with the inner tube, a first oil room being defined between the oil tube and the valve unit, and an oil storage member being an elongate tube and made by resilient material, the oil storage member mounted to the oil tube, a first end of the oil storage member fixed to a connection member and a second end of the oil storage member fixed to the end cap, a first air room defined between the inlet valve, the oil storage member and the inner tube, a second oil room defined between the oil tube, the oil storage member and the end cap, an oil path being in communication between the first and second oil rooms, oil in the first oil room flowing into the second oil room via the valve unit and the end cap by operation of the valve unit.

2. The seat tube as claimed in claim 1, wherein the inlet valve has a base which is fixed to the inner tube, the base has an inlet valve and an air path, the inlet valve is adapted to be connected with an inflation device, the air path communicates between the inlet valve and the first air room, the inlet valve closes or opens the air path so as to maintain a pressure in the first air room.

3. The seat tube as claimed in claim 1, wherein a clamp unit is connected to the second end of the inner tube and adapted to be connected to a seat.

4. The seat tube as claimed in claim 1, wherein the end cap has a first engaging portion located at an outer periphery thereof and the oil storage member has a second engaging portion which is engaged with the first engaging portion.

5. The seat tube as claimed in claim 1, wherein the connection member is integrally formed with the inlet valve.

6. The seat tube as claimed in claim 5, wherein the connection member has a recess unit which is located corresponding to the oil storage member, a groove is defined in an inside of the recess unit and the oil storage member has a protrusion which is engaged with the groove.

7. The seat tube as claimed in claim 6, wherein the recess unit is a stepped recess which includes a first recess and a second recess which has a diameter larger than that of the first recess, the oil tube is fixed to the first recess and the oil storage member is fixed to the second recess.

8. The seat tube as claimed in claim 1, wherein the connection member is individually located between the inlet valve and the end cap, the connection member is linearly movable relative to outside of the oil tube by pressure change of the first air room, the first oil room and the second oil room, so as to balance pressure between the first air room and the second oil room.

9. The seat tube as claimed in claim 8, wherein the connection member has a recess unit which is located corresponding to the oil storage member, a groove is defined in an inside of the recess unit and the oil storage member has a protrusion which is engaged with the groove.

10. The seat tube as claimed in claim 8, wherein the inlet valve has a base fixed to the inner tube and the base has a connection groove located corresponding to the oil tube, an end of the oil tube is fixedly engaged with the connection groove.

* * * * *